United States Patent
Alex et al.

(10) Patent No.: US 9,106,280 B2
(45) Date of Patent: Aug. 11, 2015

(54) PILOT DESIGN FOR MASSIVE MIMO COMMUNICATION

(71) Applicant: Broadcom Corporation, Irvine, CA (US)

(72) Inventors: Sam Alex, Sunnyvale, CA (US); Amin Mobasher, Menlo Park, CA (US); Louay Jalloul, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 23 days.

(21) Appl. No.: 14/042,257

(22) Filed: Sep. 30, 2013

(65) Prior Publication Data
US 2014/0307816 A1   Oct. 16, 2014

Related U.S. Application Data

(60) Provisional application No. 61/812,029, filed on Apr. 15, 2013.

(51) Int. Cl.
| | |
|---|---|
| H04B 7/02 | (2006.01) |
| H04L 1/02 | (2006.01) |
| H04B 7/04 | (2006.01) |
| H04L 25/02 | (2006.01) |
| H04B 7/06 | (2006.01) |

(52) U.S. Cl.
CPC ........... *H04B 7/0413* (2013.01); *H04B 7/0404* (2013.01); *H04B 7/0684* (2013.01); *H04B 7/0691* (2013.01); *H04L 25/0202* (2013.01); *H04L 25/0204* (2013.01); *H04L 25/0228* (2013.01)

(58) Field of Classification Search
USPC ........................................................ 375/267
See application file for complete search history.

(56) References Cited

U.S. PATENT DOCUMENTS

2014/0098689 A1 *  4/2014  Lee et al. ................. 370/252

* cited by examiner

*Primary Examiner* — Tanmay Shah
(74) *Attorney, Agent, or Firm* — Sterne, Kessler, Goldstein & Fox P.L.L.C.

(57) ABSTRACT

Embodiments recognize that in MIMO and M-MIMO systems, physical antennas tend to be closely spaced to each other (e.g., a grid). As a result, a spatial correlation typically exists between physical antennas as well as between transmissions from logical antenna ports. Embodiments exploit this characteristic to reduce the amount of pilot signaling needed to enable downlink channel estimation. Specifically, embodiments limit pilot signaling to only a subset of supported logical antenna ports and rely on spatial correlation information to interpolate channels from logic antenna ports for which no pilot signaling is used.

21 Claims, 7 Drawing Sheets

FIG. 7

PILOT DESIGN FOR MASSIVE MIMO COMMUNICATION

CROSS-REFERENCE TO RELATED APPLICATION(S)

The present application claims the benefit of U.S. Provisional Application No. 61/812,029, filed Apr. 15, 2013, which is incorporated herein by reference in its entirety.

BACKGROUND

1. Technical Field

The present disclosure relates generally to antenna systems and methods for Massive Multi-Input-Multi-Output (MIMO) (M-MIMO) communication.

2. Background Art

In a Massive Multi-Input-Multi-Output (MIMO) (M-MIMO) communication system, a transmitter, such as a base station, is equipped with a very large number of transmit antennas (e.g., 32, 62, or 100) that can be used simultaneously for transmission to a receiver, such as a user equipment (UE). The receiver can have more than one receive antenna (e.g., 2, 4, 8, etc.) or even a very large number of receive antennas for simultaneously receiving transmissions from the transmitter.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Figure 1:
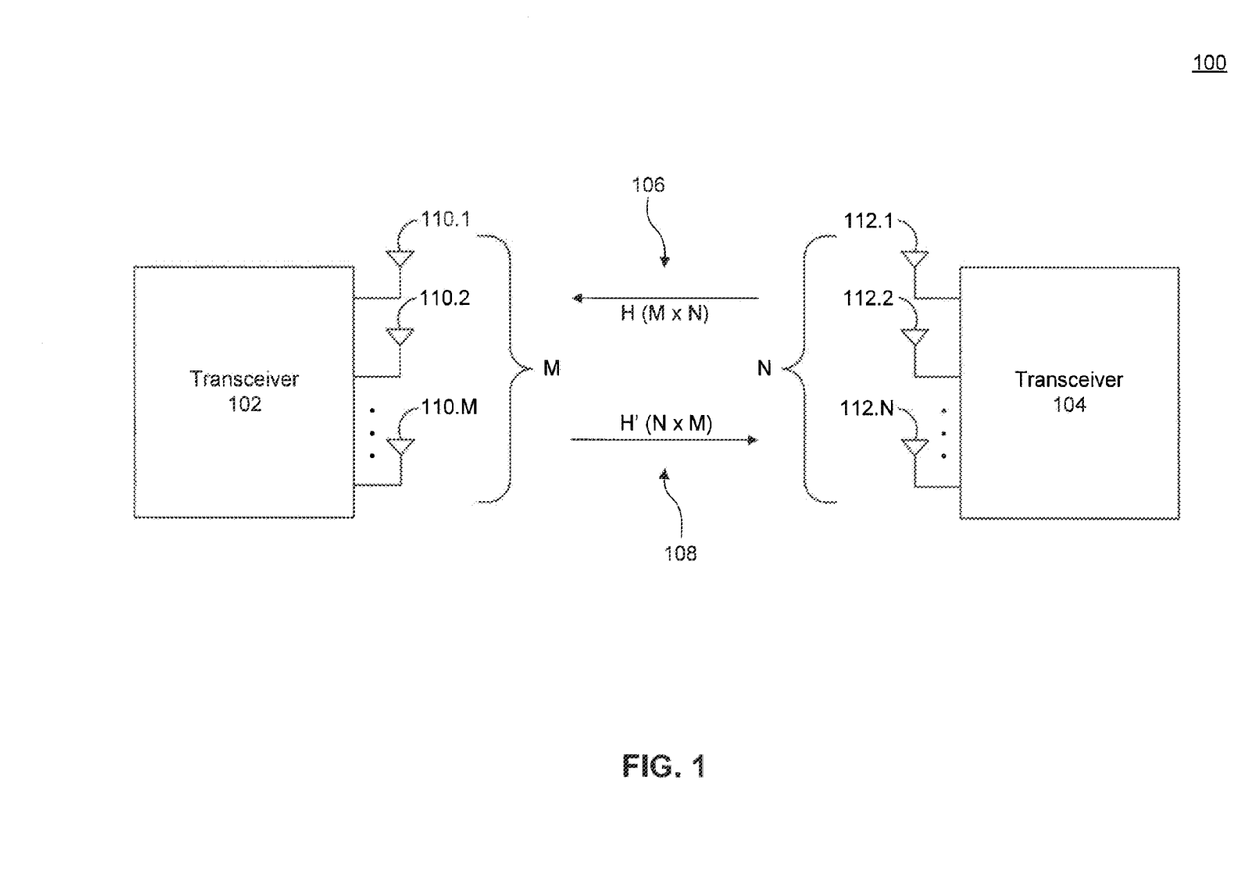
FIG. 1 illustrates an example environment in which embodiments can be practiced or implemented.

FIG. 1 illustrates an example environment 100 in which embodiments can be practiced or implemented. Example environment 100 is provided for the purpose of illustration only and is not limiting of embodiments. As shown in FIG. 1, example environment 100 includes a first transceiver 102 and a second transceiver 104. First transceiver 102 can be a base station and second transceiver 104 can be a user equipment (UE), for example, or vice versa.

As shown in FIG. 1, transceiver 102 includes M transmit antennas 110.1, ..., 110.M, which provide transceiver 102 with a transmit/receive space with M spatial dimensions. Transceiver 104 includes N transmit/receive antennas 112.1, ..., 112N, resulting in an M×N uplink channel H 106 from transceiver 104 to transceiver 102 and an N×M downlink channel H' 108 from transceiver 102 to transceiver 104. N can be equal to, lower than, or greater than M according to embodiments.

In order for transceiver 104 to transmit and receive optimally to/from transceiver 102 over channels 106 and 108 respectively, transceiver 104 needs to learn channels 106 and 108. Conventionally, transceiver 102 transmits pilot symbols from each of its antennas 110.1, ..., 110.M (e.g., for each antenna, pilots are transmitted over a number of time/frequency resources that are orthogonal to the time/frequency/code resources used by the other antennas) to transceiver 104. This enables transceiver 104 to estimate downlink channel 108. In a Time Division Duplexing (TDD) system (i.e., where the same frequency resources are used for uplink and downlink transmission), assuming channel reciprocity (i.e., that the uplink and downlink channels are similar over the same frequency resources), transceiver 104 can also infer the uplink channel 106 from the estimate of downlink channel 108. Transceiver 104 can then use the knowledge of the uplink channel estimate to beamform transmissions to transceiver 102.

In another conventional scheme, transceiver 102 estimates uplink channel 106 using pilot symbols signaled by transceiver 104. Transceiver 102 then signals the estimate of uplink channel 106 and/or uplink beamforming weights to transceiver 104. Transceiver 104 can infer the downlink channel 108 from the estimate of uplink channel 106 and can use the signaled uplink beamforming weights to beamform transmissions to transceiver 102.

However, these conventional schemes can be resource inefficient. For example, in the case of a large number of antennas 110.1, ..., 110.M at transceiver 102 (e.g., when transceiver 102 is a Massive Multi-Input-Multi-Output (MIMO) (M-MIMO) base station with a large number of transmit/receive antennas (e.g., 100 transmit antennas)), pilot signaling from each antenna to transceiver 104 requires a very large overhead. Similarly, explicit signaling of beamforming weights can waste resources, especially in the case of a multi-user system in which transceiver 102 can serve multiple transceivers 104.

Embodiments, as further described below, provide systems and methods for enabling transceiver 104 to learn uplink beamforming weights (e.g., Eigen beamforming weights) for transmission to transceiver 102, without any pilot signaling or explicit beamforming weight signaling from transceiver 102. In another embodiment, beamforming weight vectors to enable a multi-symbol spatial rate can be learned by transceiver 104. In another aspect, schemes for reducing the amount of pilot signaling needed from transceiver 102 to enable transceiver 104 to learn downlink channel 108 are provided.

Figure 2:
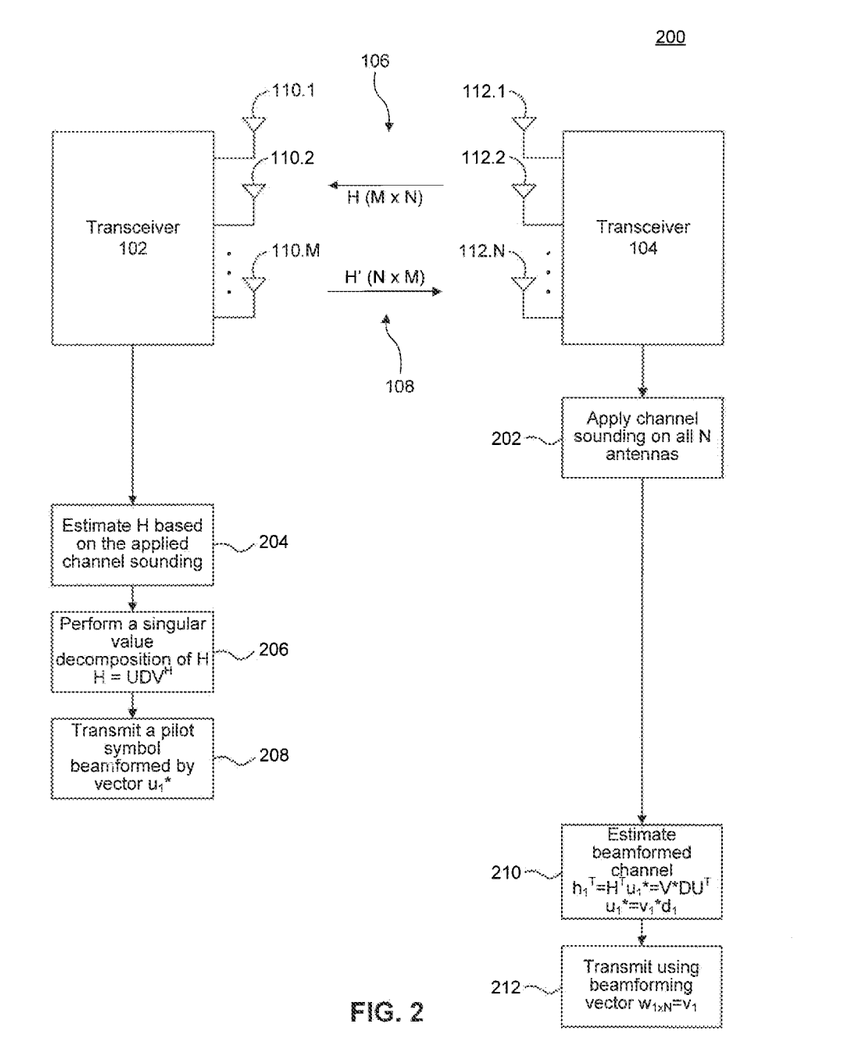
FIG. 2 illustrates an example process according to an embodiment.

FIG. 2 illustrates an example process 200 according to an embodiment. Example process 200 is provided for the purpose of illustration only and is not limiting of embodiments. For the purpose of illustration only, example process 200 is shown as being performed by example transceivers 102 and 104 described above with reference to FIG. 1.

As shown in FIG. 2, example process 200 begins in step 202, which includes transceiver 104 applying channel sounding on all of its N antennas to transceiver 102. In an embodiment, this includes, for each of antennas 112.1, ..., 112.N, transmitting a number of reference signals (known to transceiver 102) over respective time/frequency resources that are orthogonal to time/frequency resources used by the other antennas. In an embodiment, where transceiver 102 is a base station and transceiver 104 is a UE, the plurality of reference signals can be sounding reference signals (SRS), transmitted by the UE over a set of frequency tones reserved for channel sounding by the UE to the base station. Antennas 110.1, ..., 110.M of transceiver 102 receive the reference signals from antennas 112A, ..., 112.N of transceiver 104 simultaneously over respective orthogonal frequency tones, for example, or at different times over same/different frequency tones.

Subsequently, in step 204, process 200 includes transceiver 102 estimating the M×N uplink channel H 106 from transceiver 104 to transceiver 102 based on the channel sounding performed by transceiver 202. Then, in step 206, process 200 includes transceiver 102 performing a singular value decomposition of the estimate of channel H 106. The singular value decomposition decomposes H 106 into a unitary matrix U, a diagonal matrix D, and a unitary matrix V. In an embodiment, the matrix D is sorted such that the first vector corresponds to the strongest/optimal vector. The singular value decomposition of H 106 can be described mathematically as:

$$H_{M \times N} = U_{M \times m} D_{M \times N} V_{N \times N}^H \quad (1)$$

Process 200 then proceeds to step 208, which includes transceiver 102 transmitting to transceiver 104 a pilot symbol (known to transceiver 104) beamformed by a vector $u_1^*$, corresponding to the conjugate of the first column vector of the unitary matrix U. In an embodiment, where transceiver 102 is a base station and transceiver 104 is a UE, the pilot symbol can be UE-specific Demodulation Reference Signals (DMRS) symbol as defined by the Long Term Evolution (LTE) standard. In an embodiment, the same beamformed DMRS symbol is transmitted simultaneously on the same frequency tone by all M antennas of first transceiver 102. Effectively, the M antennas of first transceiver 102 appear as a single antenna to second transceiver 104 for this pilot symbol transmission.

Subsequently, process 200 proceeds to step 210, which includes transceiver 104 estimating a beamformed downlink channel (i.e., the estimate includes the applied beamforming in step 208) based on the pilot symbol transmitted by transceiver 102. The pilot symbol is received by all N antennas of transceiver 104. In an embodiment, the beamformed channel can be represented mathematically as:

$$h_1^T = H^T u_1^* = V^* D U^T u_1^* = v_1^* d_1 \quad (2)$$

where $v_1^*$ corresponds to the first column vector of the unitary matrix V, and $d_1$ is a scalar. In an embodiment, $v_1$ is the optimal beamforming vector from transceiver 104 to transceiver 102, and thus by estimating the beamformed channel transceiver 104 can immediately determine the optimal beamforming vector to transceiver 102. In an embodiment, transceiver 104 determines $v_1$ from the beamformed downlink channel estimate as $$v_1 = \frac{h_1^*}{\|h_1\|},$$

where $h_1^*$ is the conjugate of $h_1$ and $\|h_1\|$ is the norm of $h_1$.

Process 200 terminates in step 212, which includes transceiver 104 transmitting a signal to transceiver 102 using a beamforming vector $w = v_1$, where w is a N×1 weight vector. In an embodiment, this is equivalent to performing maximum ratio transmission (MRT) beamforming from transceiver 104 to transceiver 102 over channel 106, which maximizes Signal-to-Noise Ratio (SNR) at the M antennas of transceiver 102.

Figure 3:
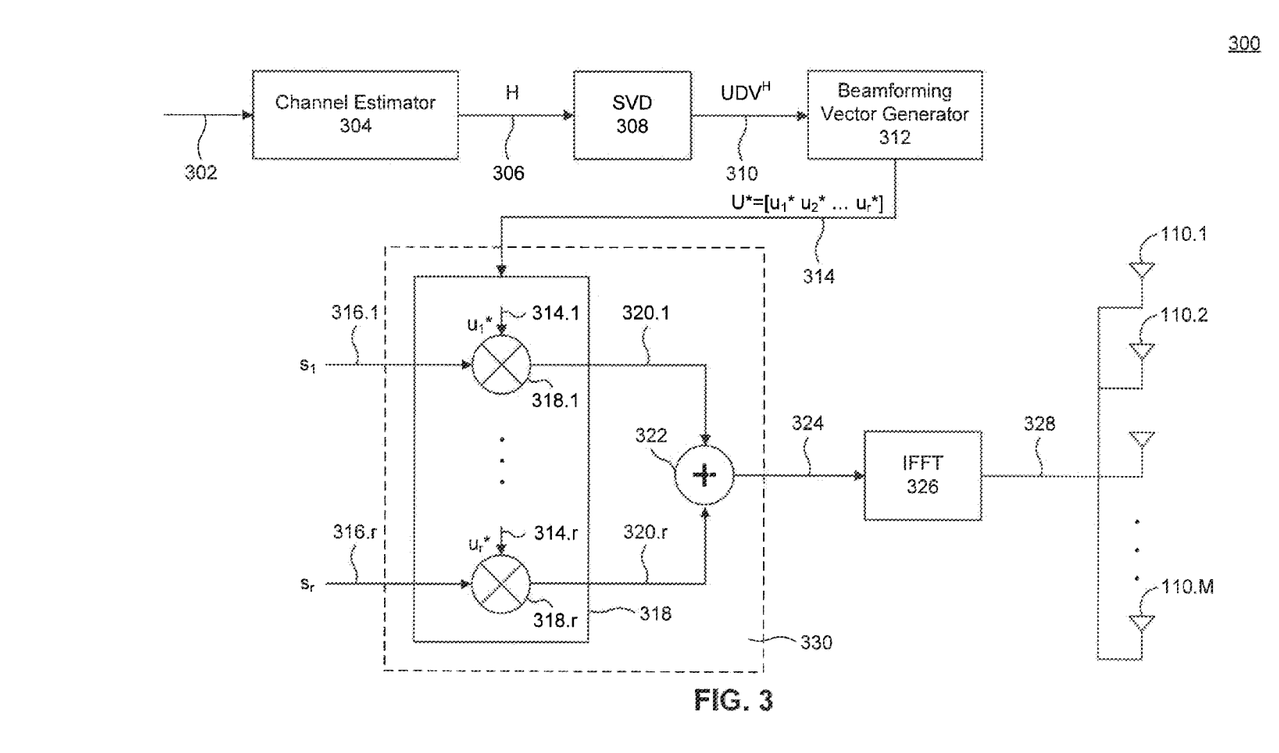
FIG. 3 illustrates an example transceiver according to an embodiment.

FIG. 3 illustrates an example transceiver 300 according to an embodiment. Example transceiver 300 is provided for the purpose of illustration only and is not limiting of embodiments. Example transceiver 300 can be an embodiment of transceiver 102 described above and can be used to perform example process 200 with another transceiver (e.g., transceiver 104). As shown in FIG. 3, example transceiver 300 includes a channel estimator 304, a singular value decomposition (SVD) module 308, a beamforming vector generator 312, a beamforming module 330, an Inverse Fast Fourier Transform (IFFT) module 326, and a plurality of antennas 110.1, ..., 110.M.

In an embodiment, antennas 110.1, ..., 110.M are configured to receive a plurality of first reference signals transmitted respectively from a plurality of antennas of another transceiver (e.g., antennas 112.1, ..., 112.N of transceiver 104). For example, each of the plurality of antennas of the other transceiver can transmit a number of first reference signals over respective time/frequency resources that are orthogonal to time/frequency resources used by the other antennas. Antennas 110.1, ..., 110.M can receive the plurality of first reference signals simultaneously over respective orthogonal frequency tones, for example, or at different times over same/different frequency tones. In an embodiment, where example transceiver 300 is a base station and the other transceiver is a UE, the plurality of first reference signals can be sounding reference signals (SRS), transmitted by the UE over a set of frequency tones reserved for channel sounding by the UE to the base station.

Channel estimator 304 is configured to receive an input signal 302, which includes the plurality of first reference signals, and to estimate an uplink channel H 306 from the plurality of antennas of the other transceiver to the plurality of antennas 110.1, ..., 110.M. Where the other transceiver includes N antennas, the uplink channel H 306 is represented by an M×N matrix. Channel estimator 304 outputs uplink channel H 306 to decomposition module 308.

SVD module 308 is configured to perform a singular value decomposition on uplink channel H 306 to generate a singular value decomposition (SVD) 310. Singular value decomposition 310 represents H 306 as the product of an M×M unitary matrix U, an M×N diagonal matrix D, and an N×N unitary matrix V*. Since V is unitary, its column vectors are orthogonal to each other. The same applies for column vectors of U.

Beamforming vector generator 312 is configured to process SVD 310 to generate a beamforming matrix 314. In an embodiment, beamforming matrix 314 is formed from column vectors (each column vector is M×1) of the unitary matrix U. For example, beamforming matrix 314 can be represented as U*=[u$_1$*u$_2$* ... u$_r$*], where u$_1$* corresponds to the conjugate of the first column vector of U, u$_2$* corresponds to the conjugate of the second column vector of U, and so on. Beamforming matrix 314 can have r column vectors (r≤M), where r is determined by the spatial rate of transmission (i.e., number of different streams transmitted simultaneously over orthogonal frequencies) from example transceiver 300 to the other transceiver.

Beamforming module 330 is configured to receive one or more second reference signals 316.1, ..., 316.r (s$_1$, ..., s$_r$) and to multiply the one or more second reference signals 316.1, ..., 316.r by respective vectors 314.1, ..., 314.r of beamforming matrix 314 to generate one or more beamformed reference signals 320.1, ..., 320.r. In an embodiment, beamforming module 330 includes a multiplier bank 318 that comprises a plurality of multipliers 318.1, ..., 318.r, each configured to multiple in the frequency domain) a respective second reference signal 316.k with a respective vector 314.k of beamforming matrix 314 to generate a beamformed reference signal 320.k (1≤k≤r). In an embodiment, where example transceiver 300 is a base station and the other transceiver is a UE, the one or more second reference signals 316.1, ..., 316.r can be UE-specific Demodulation Reference Signals (DMRS) as defined by the Long Term Evolution (LTE) standard.

In an embodiment, beamformed reference signals 320.1, ..., 320.r are combined using a combiner 322 to generate a signal 324. Signal 324 can be buffered and then acted upon by IFFT module 326 to generate a multi-earlier modulated signal 328, such as an Orthogonal Frequency Division Multiplexing (OFMD) symbol. In an embodiment, IFFT module 326 include M IFFTs, one for each antenna 110.1, ..., 110.M, and signal 328 is a vector of size M. Each of the M elements of signal 328 is produced by a respective one of the M IFFTs and is forwarded to a respective one of the plurality of antennas 110.1, ..., 110.M for transmission to the other transceiver. In an embodiment, the M elements of signal 328 are transmitted simultaneously by their respective antennas 110.1, ..., 110.M. As a result, each beamformed reference signal 320 (e.g., 320.1) is transmitted simultaneously, on the same frequency tone, by all of antennas 110.1, ..., 110.M. Further, the one or more beamformed reference signals 320.1, ..., 320.r are transmitted simultaneously on orthogonal frequency resources to the other transceiver.

Figure 4:
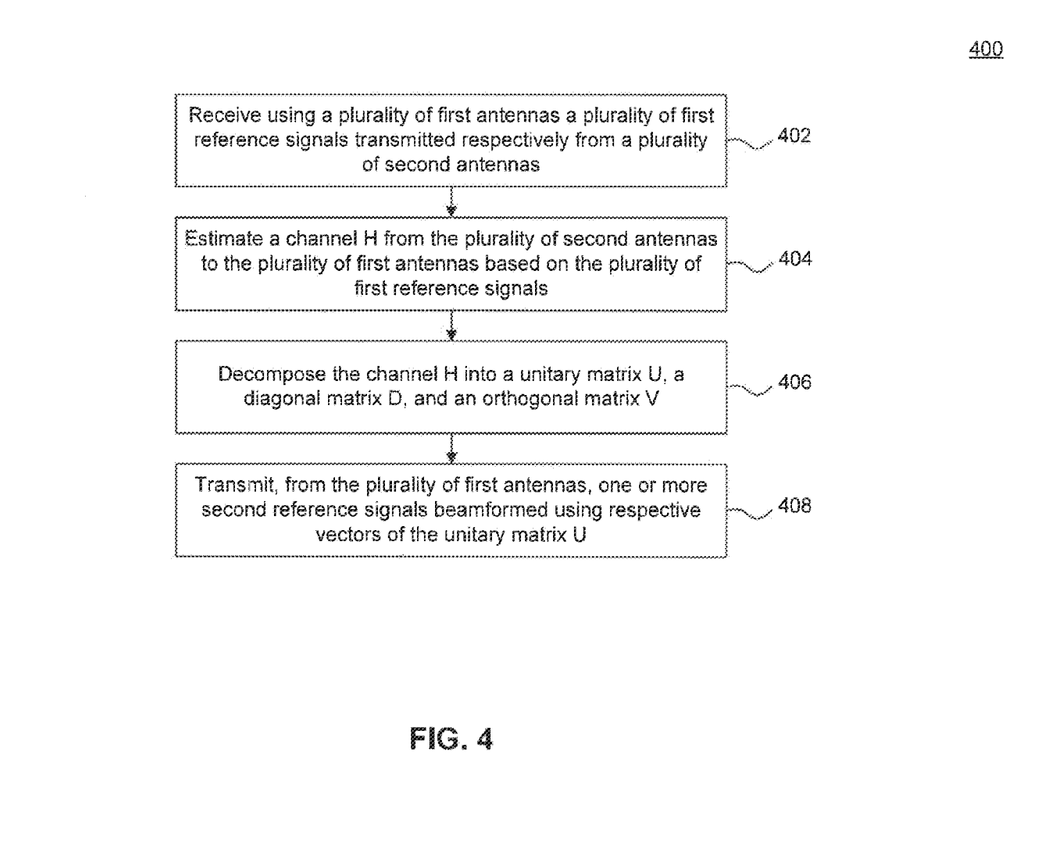
FIG. 4 illustrates another example process according to an embodiment.

FIG. 4 illustrates an example process 400 according to an embodiment. Example process 400 is provided for the purpose of illustration only and is not limiting of embodiments. Example process 400 can be performed by a first transceiver having a plurality of first antennas, such as example transceiver 300 described above, to enable a second transceiver having a plurality of second antennas to learn uplink beamforming weights (e.g., beamforming vector) to the first transceiver. The first transceiver can be a base station and the second transceiver can be a UE, or vice versa.

As shown in FIG. 4, process 400 begins in step 402, which includes receiving, using the plurality of first antennas of the first transceiver, a plurality of first reference signals transmitted respectively from the plurality of second antennas of the second transceiver. In an embodiment, where the first transceiver is a base station and the second transceiver is a UE, the plurality of first reference signals can be sounding reference signals (SRS), transmitted by the UE over a set of frequency tones reserved for channel sounding by the UE to the base station.

Subsequently, process 400 proceeds to step 404, which includes estimating a channel from the plurality of second antennas to the plurality of first antennas based on the plurality of first reference signals. In an embodiment, where the first transceiver includes M antennas and the second transceiver includes N antennas, the channel can be represented by an M×N matrix.

Then, in step 406, process 400 includes decomposing the channel into a unitary matrix U, a diagonal matrix D, and an unitary matrix V. In an embodiment, step 406 includes performing a singular value decomposition of the channel. In an embodiment, step 406 further includes forming a beamforming matrix having one or more vectors of the unitary matrix U.

Finally, process 400 terminates in step 408, which includes transmitting, from the plurality of first antennas, one or more beamformed reference signals, the one or more beamformed reference signals resulting from multiplying one or more second reference signals by respective vectors of the unitary matrix U of the channel. In an embodiment, where the first transceiver is a base station and the second transceiver is a UE, the one or more second reference signals can be UE-specific Demodulation Reference Signals (DMRS) as defined by the Long Term Evolution (LTE) standard.

In an embodiment, step 408 includes transmitting a first beamformed reference signal resulting from multiplying a respective one of the one or more second reference signals by a first column vector of the unitary matrix of the channel. In another embodiment, step 408 includes transmitting the first beamformed reference signal simultaneously by each of the plurality of first antennas of the first transceiver. As described above with reference to FIG. 2, when the second transceiver estimates the channel based on the first beamformed reference signal (or any beamformed reference signal), the generated estimate will be proportional to (e.g., scaled version of) a beamforming vector that can be used by the second transceiver to beamform transmissions to the first transceiver. In an embodiment, the beamforming vector enables maximum ratio transmission (MRT) beamforming from the second transceiver to the first transceiver over the channel.

In another aspect, referring to FIG. 1, embodiments include schemes for reducing the amount of pilot signaling needed from transceiver 102 to enable transceiver 104 to learn downlink channel 108. Example embodiments of such schemes are now provided. Generally, these example embodiments are described with reference to the LTE standard architecture. However, embodiments are not limited to LTE as would be apparent to a person of skill in the art based on the teachings herein.

Figure 5:
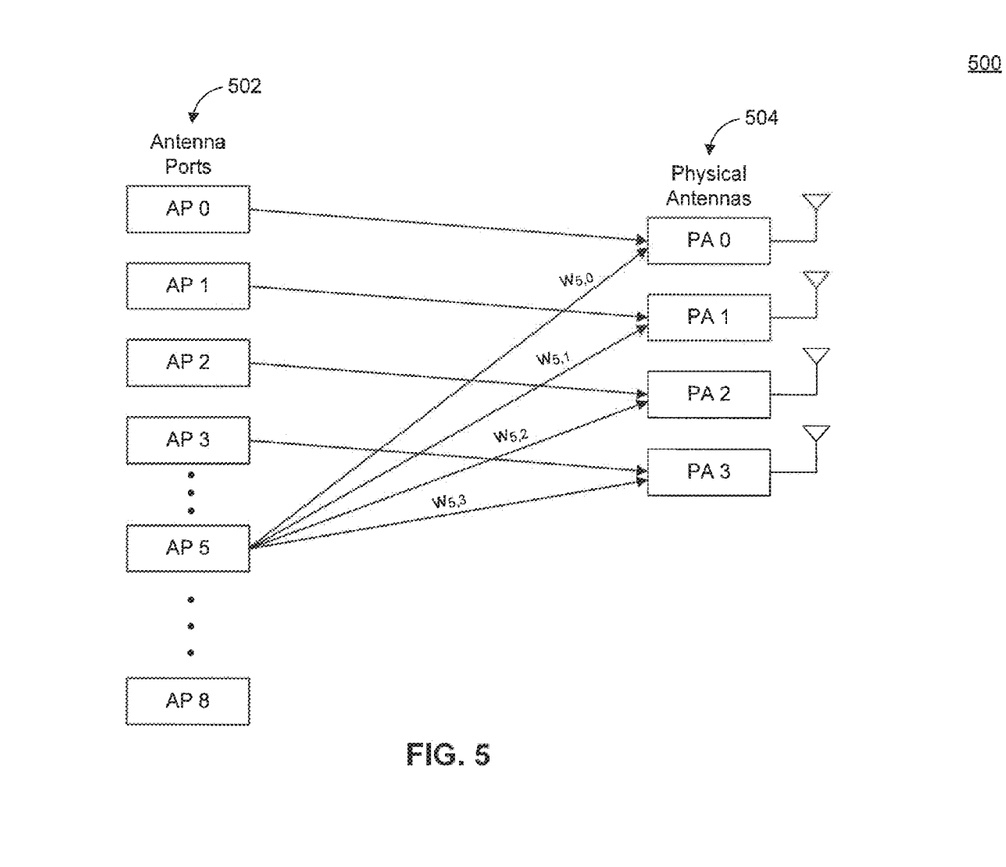
FIG. 5 illustrates an example mapping of logical antenna ports to physical antennas.

FIG. 5 illustrates an example mapping 500 of logical antenna ports to physical antennas. Example mapping 500 is provided for the purpose of illustration and is not limiting of embodiments. Example mapping 500 can be used in a MIMO transceiver, such as an LTE-based base station (eNodeB), for example.

As shown in FIG. 5, example mapping 500 maps logical antenna ports 502 to physical antennas 504. Each antenna port can be mapped to one or more physical antennas. Transmitting on a logical antenna port includes transmitting using all of its mapped physical antennas. When a logical antenna port is mapped to more than one physical antennas, both data and pilot signals are multiplied by respective weights for the multiple physical antennas. For example, transmitting on logical antenna port AP5 is done by transmitting using all of physical antennas PA0, PA1, PA2, and PA3 by multiplying the signal being transmitted by weights $w_{5,0}$, $w_{5,1}$, $w_{5,2}$, and $w_{5,3}$ for physical antennas PA0, PA1, PA2, and PA3 respectively.

Typically, a receiver at the receiving end of transmissions from physical antennas 504 (e.g., a UE) is aware of only logical antenna ports 502 and their associated physical resource blocks (time and frequency blocks). For example, the receiver may have knowledge that transmissions from AP0 occur on specific frequencies during specific time slots. However, the receiver does not know which of physical antennas 504 is/are used to transmit from AP0. As a result, downlink channel estimation at the receiver is performed with respect to logical antenna ports 502 as opposed to physical antennas 504. For a logical antenna port that is mapped to a single physical antenna (e.g., AP0), the corresponding downlink channel encompasses the channel(s) from the physical antenna (e.g., PA0) to the receiver antenna(s). For a logical antenna port that is mapped to multiple physical antennas (e.g., AP5), the receiver estimates a composite channel from the multiple physical antennas (e.g., PA0, PA1, PA2, and PA3) to the receiver antenna(s). The composite channel includes the weights (e.g., $w_{5,0}$, $w_{5,1}$, $w_{5,2}$, and $w_{5,3}$) associated with the physical antennas during transmission.

Conventionally, in order for the receiver to estimate the entire downlink channel, the transceiver transmits pilot symbols for each of its supported logical antenna ports (e.g., for each logical antenna port, pilot symbols are transmitted from its associated physical antenna(s) over respective physical resource blocks). However, this can be very resource inefficient. This is especially true in the case of M-MIMO systems, where the number of logical antenna ports can be very large (e.g., 16, 32, 64, etc.).

Embodiments, as further described below, recognize that in MIMO and M-MIMO systems, physical antennas tend to be closely spaced to each other (e.g., a grid). As a result, a spatial correlation typically exists between physical antennas as well as between transmissions from logical antenna ports. Embodiments exploit this characteristic to reduce the amount of pilot signaling needed to enable downlink channel estimation. Specifically, embodiments limit pilot signaling to only a subset of supported logical antenna ports and rely on spatial correlation information to interpolate channels from logic antenna ports for which no pilot signaling is used.

Figure 6:
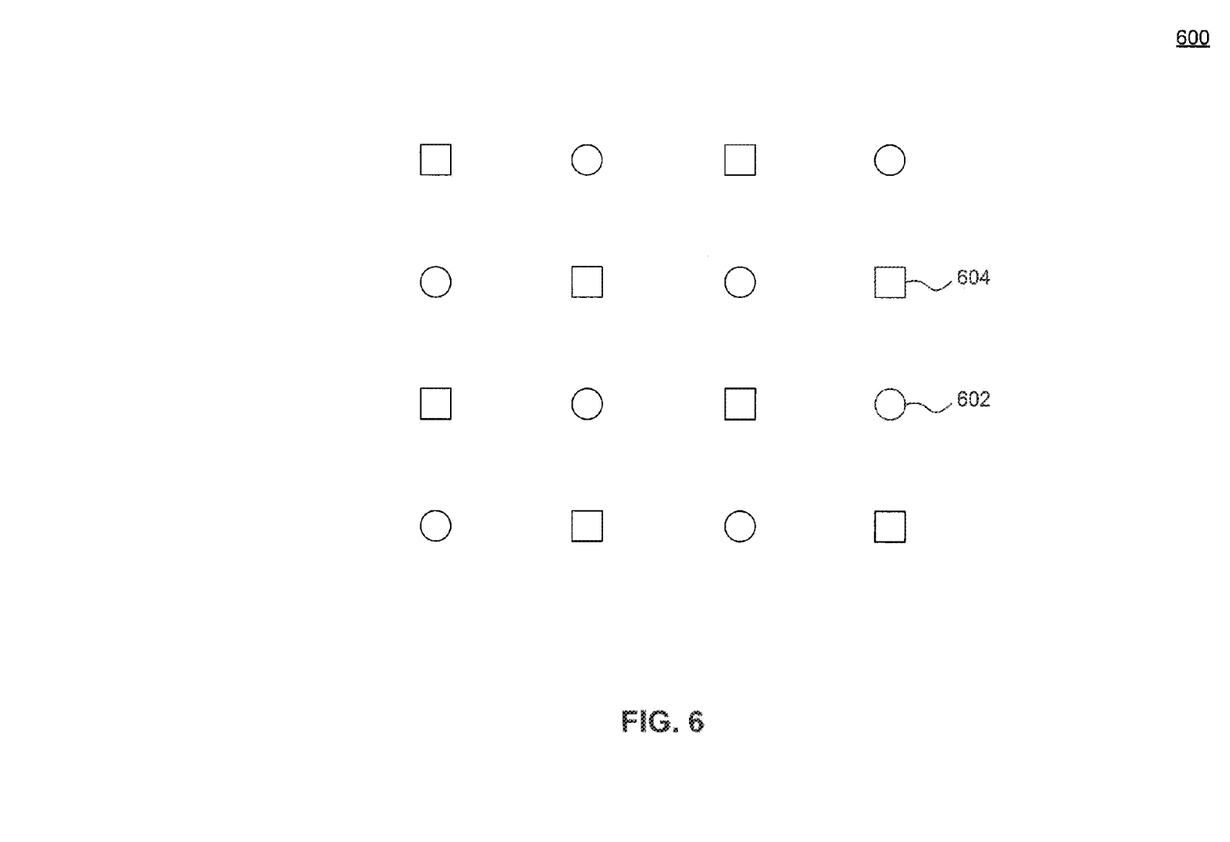
FIG. 6 illustrates an example logical antenna port pilot transmission configuration according to an embodiment.

FIG. 6 illustrates an example logical antenna port pilot transmission configuration 600 according to an embodiment. Example configuration 600 is provided for the purpose of illustration only and is not limiting of embodiments. For the purpose of illustration only and not limitation, it is assumed that the transceiver (e.g., base station) using configuration 600 supports 16 logical antenna ports, and that each of the 16 logic antenna ports is mapped to a single distinct physical antenna of an antenna grid with 16 physical antennas as shown in FIG. 6. However, embodiments are not limited to this example and can be extended to cases where a logical antenna port can be mapped to more than one physical antenna.

In an embodiment, example configuration 600 includes transmitting pilot symbols for only a subset of the supported logical antenna ports (pilot transmission subset). For example, pilot signaling can be performed for only those logical antenna ports that are mapped to physical antennas illustrated using circles in FIG. 6. However, no pilot symbols are transmitted for the logical antenna ports that are mapped to physical antennas illustrated using squares in FIG. 6 (no-pilot transmission subset).

A receiver (e.g., a UE) at the receiving end of the pilot signaling can calculate the respective channels for the pilot transmission subset of logical antenna ports. For example, the UE can determine the channel for the logical antenna port mapped to physical antenna 602. Then, with knowledge of example configuration 600 (e.g., knowledge of the pilot transmission subset) and spatial correlation information among the logical antenna ports, the receiver can determine by interpolation the respective channels for the no-pilot transmission subset of logical antenna ports. For example, the UE can interpolate from the channel determined from physical antenna 602 to determine the channel for the logical antenna port mapped to physical antenna 604. Such interpolation can take into account the relative positions of physical antennas 602 and 604, accounting for any differences such relative positions can have on transmissions to a receiver. In embodiment, these differences can be determined mathematically, by approximation, and and/or using actual a priori testing.

The transceiver can signal the logical antenna port pilot transmission configuration and the spatial correlation information to the receiver. In another embodiment, the receiver can compute the spatial correlation information using Angle of Arrival (AoA) information associated with pilot signals received from the transceiver. The receiver can also compensate this computed spatial correlation information based on changing environment conditions (e.g., fast changing channel or slow changing channel). In an embodiment, the spatial correlation information includes a physical antenna spatial configuration, which can include one of: actual positions of the plurality of physical antennas, relative positions of the plurality of physical antennas (e.g., positions of the physical antennas relative to a fixed coordinate point), a spatial correlation matrix of the plurality of physical antennas of the transceiver (e.g., a co-variance matrix that provides a spatial correlation value between any two physical antennas), and a value identifying a physical antenna configuration (e.g., number and locations of physical antennas) known to the receiver. In an embodiment, the spatial correlation information can also include a mapping of logical antenna ports to physical antennas, such as example mapping 500, for example. In another embodiment, the spatial correlation information includes a spatial correlation matrix of the logical antenna ports (e.g., which already accounts for the mapping of logical antenna ports to physical antennas).

Figure 7:
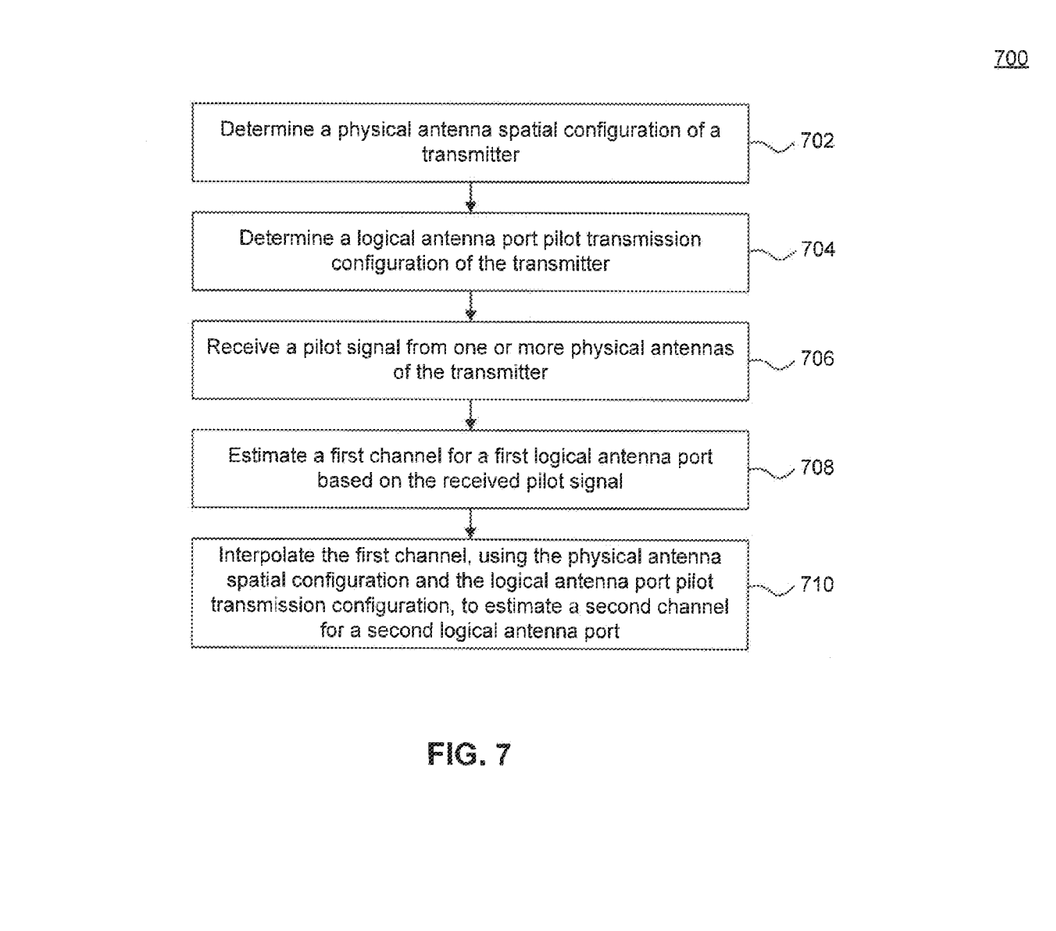
FIG. 7 illustrates an example process according to an embodiment.

FIG. 7 illustrates an example process 700 according to an embodiment. Example process 700 is provided for the purpose of illustration only and is not limiting of embodiments. Example process 700 can be performed by a receiver, such as a UE, to determine a channel from a transmitter, such as a base station, having a plurality of physical antennas and supporting a plurality of logical antenna ports.

As shown in FIG. 7, process 700 begins in step 702, which includes determining a physical antenna spatial configuration of the transmitter. In an embodiment, step 702 further includes receiving from the transmitter one of: actual positions of the plurality of physical antennas of the transmitter, relative positions of the plurality of physical antennas of the transmitter, and a spatial correlation matrix of the plurality of physical antennas of the transmitter. In another embodiment, step 702 also includes receiving actual or relative positions of the plurality of physical antennas of the transmitter; and calculating the spatial correlation matrix of the plurality of physical antennas using the actual or relative positions of the plurality of physical antennas. In a further embodiment, step 702 also includes receiving a mapping of logical antenna ports to physical antennas.

Process 700 then proceeds to step 704, which includes determining a logical antenna port pilot transmission configuration of the transmitter. In an embodiment, the logical antenna port pilot transmission configuration includes information regarding first logical antenna ports of the plurality of logical antenna ports with pilot signal transmission (pilot transmission subset) and second logical antenna ports of the plurality of logic antenna ports without pilot signal transmission (no-pilot transmission subset). In an embodiment, step 704 includes receiving the logical antenna port pilot transmission configuration from the transmitter or retrieving a pre-determined configuration from memory.

Subsequently, in step 706, process 700 includes receiving a pilot signal from one or more physical antennas of the plurality of physical antennas of the transmitter. Step 706 can be performed by one or more antennas. Then, in step 708, process 700 includes estimating a first channel for a first logical antenna port based on the received pilot signal. The first antenna belongs to the pilot transmission subset and is mapped to the one or more physical antennas from which the pilot signal is transmitted. Step 706 can be performed by a channel estimator, such as channel estimator 304.

Process 700 terminates in step 710, which includes interpolating the first channel, using the physical antenna spatial configuration and the logical antenna port pilot transmission configuration, to estimate a second channel for a second logical antenna port of the plurality of logical antenna ports. The second logical antenna port belongs to the no-pilot transmission subset of the plurality of logical antenna ports. Step 710 can be performed by an interpolator module, which can be located within the channel estimator, for example.

In another embodiment, process 700 can be performed using a logical antenna port spatial configuration (e.g., a spatial correlation matrix of the logical antenna ports, which accounts for the mapping of logical antenna ports to physical antennas) instead of a physical antenna spatial configuration.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method for determining a channel from a transmitter having a plurality of physical antennas and supporting a plurality of logical antenna ports, comprising:
   determining a physical antenna spatial configuration of the transmitter;
   determining a logical antenna port pilot transmission configuration of the transmitter that includes information regarding first logical antenna ports of the plurality of logical antenna ports with pilot signal transmission and second logical antenna ports of the plurality of logic antenna ports without pilot signal transmission;
   receiving a pilot signal from one or more physical antennas of the plurality of physical antennas of the transmitter;
   estimating a first channel for a first logical antenna port of the plurality of logical antenna ports, based on the received pilot signal; and
   interpolating the first channel, using the physical antenna spatial configuration and the logical antenna port pilot transmission configuration, to estimate a second channel for a second logical antenna port of the plurality of logical antenna ports,
   wherein pilot signals are transmitted using the first logical antenna ports and are not transmitted using the second logical antenna ports.

2. The method of claim 1, wherein determining the physical antenna spatial configuration comprises receiving actual positions of the plurality of physical antennas of the transmitter.

3. The method of claim 1, wherein determining the physical antenna spatial configuration comprises receiving relative positions of the plurality of physical antennas of the transmitter.

4. The method of claim 1, wherein determining the physical antenna spatial configuration comprises receiving a spatial correlation matrix of the plurality of physical antennas of the transmitter.

5. The method of claim 1, wherein determining the physical antenna spatial configuration comprises receiving a value from the transmitter, wherein the value identifies a known physical antenna configuration.

6. The method of claim 1, wherein determining the physical antenna spatial configuration comprises determining the physical antenna spatial configuration based at least in part on Angle of Arrival (AoA) information associated with signals received from the transmitter.

7. The method of claim 1, wherein the physical antenna spatial configuration includes a spatial correlation matrix of the plurality of physical antennas of the transmitter, the method further comprising:
   receiving actual or relative positions of the plurality of physical antennas of the transmitter;
   calculating the spatial correlation matrix of the plurality of physical antennas using the actual or relative positions of the plurality of physical antennas.

8. The method of claim 1, wherein the first logical antenna port is mapped to a single physical antenna of the plurality of physical antennas, and wherein the first channel includes a channel from the single physical antenna.

9. The method of claim 1, wherein the first logical antenna port is mapped to multiple physical antennas of the plurality of physical antennas, and wherein the first channel includes a composite channel from the multiple physical antennas.

10. The method of claim 8, wherein the composite channel includes respective transmission weights associated with the multiple physical antennas.

11. A method for determining a channel from a transmitter having a plurality of physical antennas and supporting a plurality of logical antenna ports, the method comprising:
   receiving spatial correlation information from the transmitter;
   determining a logical antenna port pilot transmission configuration of the transmitter that includes information regarding first logical antenna ports of the plurality of logical antenna ports with pilot signal transmission and second logical antenna ports of the plurality of logic antenna ports without pilot signal transmission;
   receiving a pilot signal from one or more physical antennas of the plurality of physical antennas of the transmitter;
   estimating a first channel for a first logical antenna port of the plurality of logical antenna ports, based on the received pilot signal, wherein the first logical antenna port is mapped to the one or more physical antennas of the transmitter; and interpolating the first channel to estimate a second channel for a second logical antenna port of the plurality of logical antenna ports.

12. The method of claim 11, wherein interpolating the first channel comprises interpolating the first channel, using the spatial correlation information and the logical antenna port pilot transmission configuration, to estimate the second channel.

13. The method of claim 11, wherein the spatial correlation information includes a physical antenna spatial configuration.

14. The method of claim 13, wherein the physical antenna spatial configuration includes one of: actual positions of the plurality of physical antennas of the transmitter, relative positions of the plurality of physical antennas of the transmitter, a spatial correlation matrix of the plurality of physical antennas of the transmitter, and a value that identifies a known physical antenna configuration.

15. The method of claim 13, wherein the spatial correlation information further includes a mapping of the plurality of logical antenna ports to the plurality of physical antennas.

16. The method of claim 11, wherein the spatial correlation information includes a spatial correlation matrix of the plurality of logical antenna ports.

17. A method for determining a channel from a transmitter having a plurality of physical antennas and supporting a plurality of logical antenna ports, comprising:

determining a physical antenna spatial configuration of the transmitter;

determining a logical antenna port pilot transmission configuration of the transmitter;

receiving a pilot signal from one or more physical antennas of the plurality of physical antennas of the transmitter;

estimating a first channel for a first logical antenna port of the plurality of logical antenna ports, based on the received pilot signal; and interpolating the first channel, using the physical antenna spatial configuration and the logical antenna port pilot transmission configuration, to estimate a second channel for a second logical antenna port of the plurality of logical antenna ports, wherein the first logical antenna port is mapped to a single physical antenna of the plurality of physical antennas, and wherein the first channel includes a channel from the single physical antenna.

18. The method of claim 17, wherein determining the physical antenna spatial configuration comprises receiving actual positions of the plurality of physical antennas of the transmitter.

19. The method of claim 17, wherein determining the physical antenna spatial configuration comprises receiving relative positions of the plurality of physical antennas of the transmitter.

20. The method of claim 17, wherein determining the physical antenna spatial configuration comprises receiving a spatial correlation matrix of the plurality of physical antennas of the transmitter.

21. The method of claim 17, wherein determining the physical antenna spatial configuration comprises receiving a value from the transmitter, wherein the value identifies a known physical antenna configuration.

* * * * *